United States Patent
Breukink et al.

(10) Patent No.: US 10,542,662 B2
(45) Date of Patent: Jan. 28, 2020

(54) SEED PRIMING

(71) Applicant: INCOTEC HOLDING B.V., Enkhuizen (NL)

(72) Inventors: Janwillem Breukink, Enkhuizen (NL); Hinderikus Bruggink, Enkhuizen (NL); Gustaf Robert Forsberg, Enkhuizen (NL); Tomoko Mizuguchi, Enkhuizen (NL); Sven Ola Arvidsson, Enkhuizen (NL); Sven Gunnar Andersson, Enkhuizen (NL)

(73) Assignee: Thermoseed Global AB, Knivsta (SE)

( * ) Notice: Subject to any disclaimer, the term of this patent is extended or adjusted under 35 U.S.C. 154(b) by 151 days.

(21) Appl. No.: 15/117,971

(22) PCT Filed: Feb. 20, 2015

(86) PCT No.: PCT/NL2015/050109
§ 371 (c)(1),
(2) Date: Aug. 10, 2016

(87) PCT Pub. No.: WO2015/126250
PCT Pub. Date: Aug. 27, 2015

(65) Prior Publication Data
US 2016/0353656 A1 Dec. 8, 2016

(30) Foreign Application Priority Data
Feb. 21, 2014 (EP) .................................. 14156139

(51) Int. Cl.
*A01C 1/06* (2006.01)
(52) U.S. Cl.
CPC ..................... *A01C 1/06* (2013.01)
(58) Field of Classification Search
CPC .............. A01C 1/02; A01C 1/025; A01C 1/06
(Continued)

(56) References Cited

U.S. PATENT DOCUMENTS 2,584,972 A * 2/1952 Altschul .................. A23B 9/26
47/58.1 R
2,735,756 A * 2/1956 Farber ....................... C05F 7/02
106/900
(Continued)

FOREIGN PATENT DOCUMENTS

EP 0 202 879 A1 11/1986
EP 622085 A1 * 3/1994 ............... A61L 2/04
(Continued)

OTHER PUBLICATIONS

International Search Report and Written Opinion for International Application PCT/NL2015/050109, dated May 13, 2015, 10 pages.
(Continued)

*Primary Examiner* — Tien Q Dinh
*Assistant Examiner* — Ebony E Evans
(74) *Attorney, Agent, or Firm* — Renner, Otto, Boisselle & Sklar, LLP

(57) ABSTRACT

The invention relates to a method for preparing primed seed, a method for improving the germination rate of seed, and a use of a gaseous composition.

The method for preparing primed seed comprises successively:
providing seed that is capable of germinating,
exposing said seed to a treatment atmosphere for an exposure time of at least 1 second, wherein the treatment atmosphere has a relative humidity of 50% or more and a temperature of 50-100° C., and wherein the exposure time has a duration of 30 minutes or less, and
cooling and optionally drying said seed.

12 Claims, 8 Drawing Sheets

(58) Field of Classification Search
USPC .......................................................... 47/57.6
See application file for complete search history.

(56) References Cited

U.S. PATENT DOCUMENTS

| | | | | |
|---|---|---|---|---|
| 3,698,133 | A * | 10/1972 | Schreiber | A01C 1/06 427/4 |
| 4,905,411 | A * | 3/1990 | Finch-Savage | A01C 1/00 47/57.6 |
| 4,912,874 | A * | 4/1990 | Taylor | A01C 1/02 47/57.6 |
| 4,975,364 | A * | 12/1990 | Taylor | A01C 1/025 435/29 |
| 5,232,465 | A * | 8/1993 | White | A01C 1/02 47/58.1 R |
| 5,522,907 | A * | 6/1996 | Bruggink | A01C 1/00 47/57.6 |
| 5,615,518 | A * | 4/1997 | Suzuki | A61L 2/04 47/58.1 R |
| 5,873,197 | A * | 2/1999 | Rowse | A01C 1/02 47/16 |
| 6,112,457 | A * | 9/2000 | Kohno | A01C 1/06 47/57.6 |
| 6,313,377 | B1 * | 11/2001 | Schipper | A01C 1/00 47/58.1 R |
| 6,415,547 | B1 * | 7/2002 | Enomoto | A23B 9/02 47/58.1 SE |
| 7,748,163 | B2 * | 7/2010 | van Deventer | A01C 1/08 47/58.1 SE |
| 8,381,438 | B2 | 2/2013 | Van Duijn et al. | |
| 8,613,158 | B2 * | 12/2013 | Conrad | A01C 1/025 47/14 |
| 2010/0126065 | A1 * | 5/2010 | Nishimura | A01C 1/02 47/58.1 SE |
| 2018/0177187 | A1 * | 6/2018 | Sanchez-Sava | A01C 1/08 |

FOREIGN PATENT DOCUMENTS

| | | | | |
|---|---|---|---|---|
| EP | 622085 | A1 * | 7/1994 | A61L 2/04 |
| EP | 2574223 | | 4/2013 | |
| FR | 2704383 | | 11/1994 | |
| JP | S62-29904 | A | 2/1987 | |
| JP | H7-289021 | A | 11/1995 | |
| JP | 2012-55259 | A | 3/2012 | |
| JP | 2001-513658 | A | 9/2019 | |
| WO | 9738734 | | 10/1997 | |
| WO | 9933331 | | 7/1999 | |
| WO | 2011028115 | | 3/2011 | |

OTHER PUBLICATIONS

Rouhi et al., The effects of Osmo and Hydrothermal priming on germination traits of Sheep Fescue (*Festuca ovine* L.), Annals of Biological Research 2012, vol. 3, No. 5, pp. 2479-2485.

Zekeriya Akman, "Comparison of High Temperature Tolerance in Maize, Rice and Sorghum Seeds by Plant Growth Regulators", Journal of Animal and Veterinary Advances 2009, vol. 8, No. 2, pp. 358-361.

Waheed et al., Different treatment of rice seed dormancy breaking, germination of both wild species and cultivated varieties (*Oryza sativa* L.), J. Mater Environ. Sci., 2012, vol. 3, No. 3, pp. 551-560.

Daniel J. Cantliffe, "Seed Germination for Transplants", Hort Technology 1998, vol. 8, No. 4, pp. 499-503.

Ranal, et al., How and why to measure the germination process?, Revista Brasil Bot. 2006, vol. 29, No. 1, pp. 1-11.

Bölek, et al.; "Hydropriming and Hot Water-Induced Shock Increase Cotton Seed Germination and Seedling Emergence at Low Temperature"; Turkish Journal of Agriculture and Forestry, 2013-15-15, pp. 300-306.

Sani, et al.: "Effect of Thermoprinimg on Seedling Production in Trigonella", Advances in Environmental Biology, 5(11) 3636-3640, 2011.

Dr. Jung Myung Lee, "Seed Enhancement for Healthy Seedlings", APSA Technical Report No. 40, Presented at Asian Seed 2004, Sep. 2004, pp. 1-20.

Japanese Office Action for corresponding Japanese Patent Application No. 2016-553566 dated Feb. 5, 2019.

Sharma, A.D., "Comparison of Various Seed Priming Methods for Seed Germination, Seedling Vigor and Fruit Yield in Okra", Scientia Horticulturae, Elsevier Science Publishers, vol. 165, Nov. 28, 2013, pp. 75-81.

* cited by examiner

SEED PRIMING

CROSS REFERENCE TO RELATED APPLICATIONS

This application is the National Stage filing of International Appln. No. PCT/NL2015/050109, filed 20 Feb. 2015, and claims priority of European Patent Application No. 14156139.9, filed 21 Feb. 2014, the entirety of which applications is incorporated herein by reference for all purposes.

The invention relates to a method for preparing primed seed, a method for improving the germination rate of seed, and a use of a gaseous composition.

Seed can be primed to obtain faster and more uniform germination, which can result in a stronger crop stand. Priming can also be used to broaden the temperature range at which seed will germinate and can be used to break certain types of dormancy as well, such as photodormancy or thermodormancy. The most often used methods of seed priming include osmotic priming, hydropriming, solid matrix priming and drum priming.

Osmotic priming involves immersing seed in a solution of an osmotic material, for example polyethylene glycol. A disadvantage of this method is the need for disposal of the used osmotic materials. Solid matrix priming involves the incubation of seeds in the presence of a solid, insoluble matrix with a limited amount of water and has similar disadvantages as osmopriming.

Hydropriming involves the soaking of seed in water prior to sowing. Typically, seed is soaked for several days at a temperature below 30° C., typically 15-20° C. An example of hydropriming of seed is described in Rouhi et al., *Annals of Biological Research* 2012, 3(5), 2479-2485. Seeds were immersed in distilled water at 15° C. and 25° C. for 12, 24, 36 and 48 hours under dark conditions. Drum priming involves the hydration of seeds in a drum which is slowly rotated about its horizontal longitudinal axis. Water is added to the drum slowly enough to allow the seeds to completely absorb it, so that they become hydrated without appearing wet.

Akman, *Journal of Animal and Veterinary Advances* 2009, 8(2), 358-361, mentions that high temperatures, as used in some dry heat treatments of seeds to control external and internal seed-borne pathogens, can reduce seed viability and seedling vigour. Akman mentions that a dry heat treatment at 40° C. for 72 hours resulted in lower seed germination and seedling vigour in rice. An impairment of seed germination was also observed for a dry heat treatment at 60° C. for 24 hours. Waheed et al. (*J. Mater. Environ. Sci.* 2012, 3(3), 551-560) mention that dry heat treatment at 50° C. for 7 and 14 days of rice gave an increase in germination. A disadvantage of the treatment is the long duration.

Exposure of seed to high temperature and high relative humidity is generally avoided because the conventional expectation is generally that this would rapidly reduce germination and seedling vigour (see e.g. Cantliffe, *HortTechnology* 1998, 8(4), 499-503).

WO-A-97/38734 describes a heat treatment process for disinfection of seeds from pathogens and other undesirable fungi and bacteria.

WO-A-99/33331 describes a method for treating seed with a fluid, in particular water. The seed can be treated over a period of 4-24 hours. In a preferred embodiment, a relative humidity of at least 98% is used. The temperature of the gas can be between 2 and 40° C. According to this document, at higher temperatures problems may occur since not all types of seed may be resistant to higher temperatures. A disadvantage is that this method requires a long treatment time.

A disadvantage of known seed priming methods is the relatively long time required for the treatment, which increases the costs and renders the methods economically unattractive for large-scale application, in particular for major crops such as rice and wheat.

Objective of the invention is to provide a seed priming method that is fast, effective, energy efficient and technically and economically suitable for large-scale application.

Figure 1:
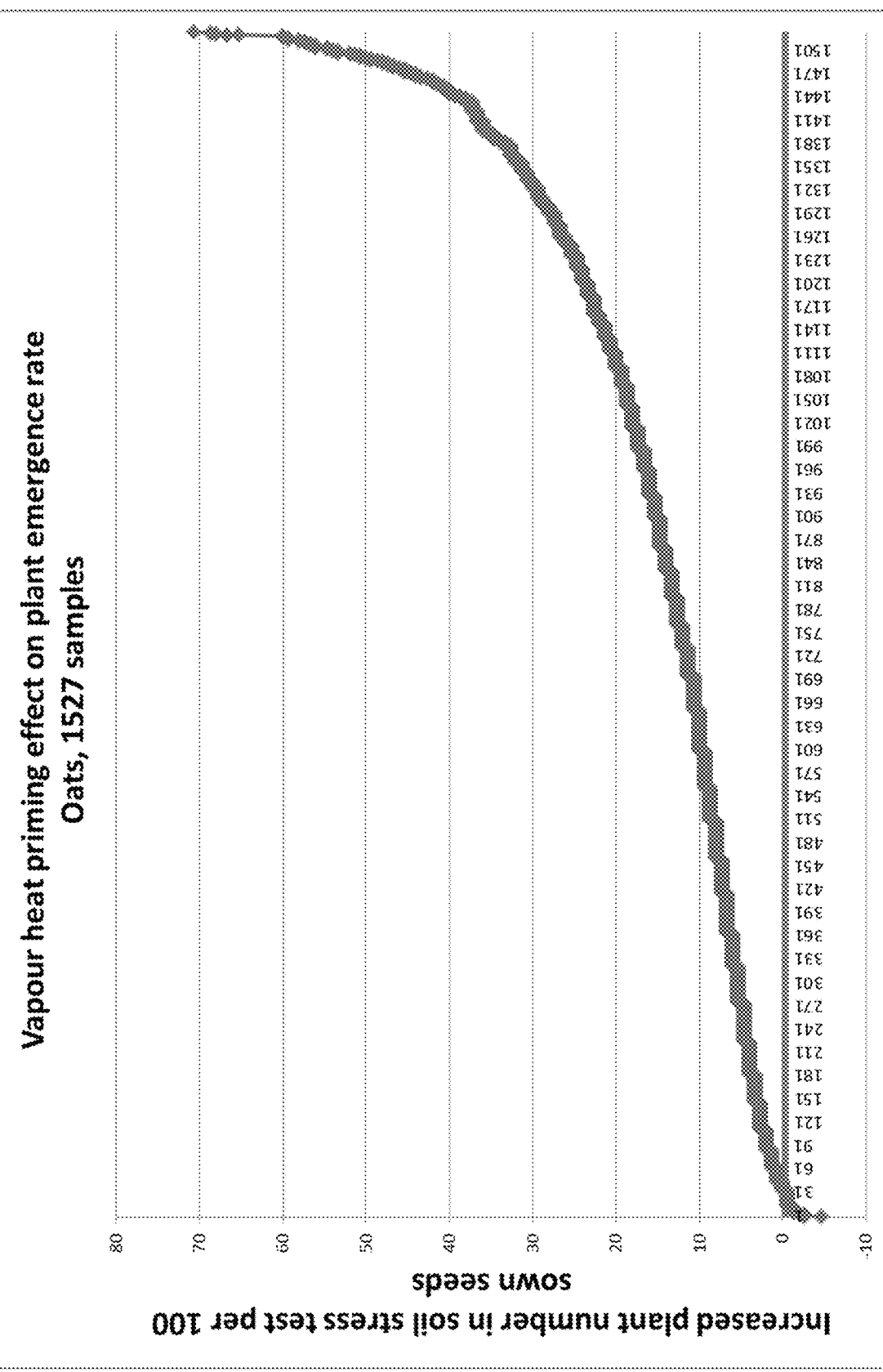
FIG. 1 is a graph showing the increase in plant emergence for Oats per 100 sown seeds for 1527 samples of seeds primed in accordance with the present invention, the samples sorted on the horizontal axis by increasing number of plants.

It has been found that this objective is met at least in part by a seed priming method comprising exposing seed to a treatment atmosphere having a particular temperature and relative humidity.

Therefore, in a first aspect, the invention relates to a method for preparing primed seed, comprising successively: providing seed capable of germinating, exposing said seed to a treatment atmosphere for an exposure time of at least 1 second, wherein the treatment atmosphere has a relative humidity of 50% or more and a temperature of 50° C. to 100° C., and wherein the exposure time has a duration of 30 minutes or less, and cooling and optionally drying said seed.

The method of the invention advantageously allows for priming of seed in a fast process that is suitable for application on large scale. A further advantage that can be obtained is preventing or mitigating hard seeds. Hard seeds are seeds that are prevented from germinating by a water-impermeable seed coat that can inhibit germination of seed of some species. A further advantage of the method is that it allows for a short duration of the treatment and for limited hydration levels.

The term "seed" as used herein refers to the ripened ovule of gymnosperms and angiosperms, which contains an embryo surrounded by a protective cover, the seed coat (testa). Some seeds comprise a pericarp or fruit coat around the seed coat. In particular when this layer is closely adhered to the seed, it is in some cases referred to as a caryopsis (cereal kernel) or an achene. Extra layers can be applied to the seed, such as a filmcoat, and by encrustment or pelleting.

The term "method for preparing primed seed" includes methods that achieve one or more of enhancement of the germination rate of the seed, enhancement of the germination synchronicity of the seed, a wider temperature range for germination, and release of dormancy. Seed priming methods usually exclude elongation by the embryonic axis, in particular radicle emergence. Emergence of the embryonic axis (usually the radicle) can be used to recognise that germination of a seed has occurred.

Although priming of seed has sometimes been defined in the art as involving controlling the hydration level within the seeds such that metabolic activity necessary for germination can occur, the seed priming method of the invention is not restricted to any particular mechanism by way of theory. Rather, the seed priming method is characterised by exposure to a treatment atmosphere having a particular temperature and relative humidity and by the effects on the germination of the seed.

The term "germination" as used herein is meant to refer to the process wherein the embryonic axis emerges from its surrounding structures. Usually, this corresponds to a radicle emerging from the testa and/or pericarp.

The term "germination rate" as used herein is meant to refer to the fraction of seeds, e.g. of a particular seed lot, that germinate over a given period, for example a period of half of the period needed for germination to be completed. The measurements of the germination rate and other descriptive parameters of germination processes are described in Ranal and De Santana, *Revista Brasil. Bot.* 2006, 29(1), 1-11.

The term "germination synchronicity" as used herein is meant to refer to the reciprocal of variance of the germination time of seed in a given sample. High values for germination synchronicity indicate a more concentrated germination time.

The term "germination time course" as used herein is meant to refer to the development of the fraction of germinated seeds as a function of time after sowing.

The term "treatment atmosphere" as used herein is meant to refer to the gaseous phase having a particular temperature and relative humidity to which seed is exposed.

The term "relative humidity" as used herein is meant to refer to the ratio of the partial pressure of water vapour in the gaseous phase to the saturated vapour pressure of water at the temperature of the treatment atmosphere.

The term "exposure time" as used herein is meant to refer to the duration of the exposure of the seed to the treatment atmosphere.

The method comprises providing a seed that is capable of germinating. Suitable seeds include non-germinated, preferably non-primed seeds. Optionally, the seed may be deprived of husk (de-husked seed or de-hulled seed). In a non-limiting optional aspect of the invention, seed is provided as essentially pathogen-free seed.

Preferably, the seed are provided at a temperature of −10° C. to +30° C., more preferably 0° C. to 25° C., directly prior to the exposure to the treatment atmosphere.

Preferably, the seeds are provided such that the subsequent exposure to the treatment atmosphere is homogeneous.

Preferably, the method comprises a first step of determining that seeds are in need of priming. Preferably, the method comprises selecting a seed lot that is in need of seed priming and providing such selected seed lot.

The method comprises exposing the seed to a treatment atmosphere for a particular exposure time, wherein the treatment atmosphere has a particular relative humidity and temperature.

Preferably, the treatment atmosphere has a relative humidity of 60% or more, more preferably 70% or more, even more preferably 80% or more, or 90% or more. Preferably, the treatment atmosphere has a relative humidity of 100% or less. Using a treatment atmosphere with such relative humidity advantageously allows reducing the amount of evaporation from the seed during the processing. In some aspects, it enhances certain controlled water absorption which can take place either from the vapour directly or from a thin layer of water condensed on the seed surface.

The treatment atmosphere can be saturated or supersaturated with water vapour. Optionally, the treatment atmosphere can comprise superheated steam. The treatment atmosphere comprises preferably a mixture of air and water vapour. The treatment atmosphere can for example be prepared by mixing air and steam. The treatment atmosphere is typically provided in the form of a stationary or flowing gaseous phase, preferably a gas stream, for example comprising air and water vapour.

Typically, the treatment atmosphere reaches a relative humidity of 100%, at least in parts of the seed bed. The method generally comprises transferring heat from steam comprised in the treatment atmosphere to the seed. The method optionally comprises condensation of water vapour from the treatment atmosphere on the seed, at least temporarily. This can advantageously contribute to efficient heat transfer to the seed. The condensation may result in the formation of a thin liquid film of water on the seed. The film can for example be absorbed to the seed surface in a controlled way. The method optionally comprises evaporating such thin liquid film of water during the phase of cooling and optionally drying. The method may also optionally comprise direct transfer of heat and moisture from the air to the seed, without condensation of water.

The treatment atmosphere has a temperature of 50-100° C., preferably 55-80° C. Optionally, the treatment atmosphere has a temperature of more than 55° C., or more than 80° C. Also possible is a temperature of more than 100° C., each of these temperature ranges for example in combination with pressures higher than 1 bar, for example 1.1 bar or more, 1.5 bar or more, 2 bar or more, 3 bar or more, 5 bar or more, typically less than 10 bar.

Preferably, the temperature and/or the dew point temperature of the treatment atmosphere are kept substantially constant, such as within a range of +/−5° C. or less, more preferably +/−2° C. or less, even more preferably +/−0.5° C. or less, for said exposure time, that is to say for a period with a duration of at least 1 second, at least 10 seconds, at least 30 seconds, at least 60 seconds or one of the other values specified as preferred exposure time, in a range with a total width of preferably 10° C. or less, more preferably 4° C. or less, even more preferably 1° C. or less.

Accordingly, the treatment atmosphere can preferably be described as "hot and humid". On the other hand, exposure to a "hot and dry" treatment atmosphere is preferably avoided. For example, an exposure of the seed of more than 5 seconds to a hot and dry atmosphere of more than 40° C. and less than 45% relative humidity is preferably avoided. In the same way, an exposure of the seed of more than 10 seconds to a hot and dry atmosphere of more than 50° C. and less than 60% relative humidity is preferably avoided.

The exposure time has a duration of 30 minutes or less. Preferably, the exposure time is 20 minutes or less, more preferably 10 minutes or less, such as 10 seconds to 10 minutes, or 30-300 seconds, or 60-300 seconds, or 90-180 seconds, in combination with a temperature of 50-100° C., preferably 55-80° C. Preferably, the seed is continuously exposed to a treatment atmosphere for such period. A further preferred method comprises a pulsed exposure to the treatment atmosphere, comprising two or more, such as three, four, five, ten, or more exposures to such treatment atmosphere, for example each of 1-60 seconds, interspersed with exposures to cooler atmospheres for example 1-60 seconds. Such pulsed exposure can for example be carried out by alternating cooling and heating.

Preferably, the treatment atmosphere comprises a gas stream, having a flow rate of 0-5 m/s just before and/or after the seed layer, more optimally 0.5-3 m/s, typically 1-2.5 m/s.

The process can be a continuous process or a batch process. In a batch process, the seed is preferably provided in a processing chamber and exposure of the seed to the treatment atmosphere preferably comprises introducing a treatment atmosphere into the processing chamber wherein the seed is present. The batch treatment chamber is preferably a closed vessel with injection of the moist air or steam prior, afterwards or simultaneously with the introduction of the seeds. Another preferred chamber is an open vessel where the treatment gas is flowing through the vessel from an entrance to an exit. The vessel is preferably equipped with a device or arrangement for mixing that can move around seeds and gas for increased uniformity. Preferably, the exposure takes place during fluidisation of the seeds, hence in a fluidised bed. Another preferred seed bed is a thin layer fixed bed.

In a continuous process, the exposure of the seed to the treatment atmosphere is preferably carried out by moving the seed on a seed bed through a processing chamber comprising the treatment atmosphere. The motion of the seeds can be carried out for example through pneumatic transport, through gravity transport, through fluidisation or through mechanic conveying (for example a screw auger, a shaking/vibrating conveyor, chain conveyor, belt conveyor or a rotating drum or an elevator) or a combination of such. The duration of the exposure of the seed to the treatment atmosphere is typically equal to the residence time of the seed in the processing chamber and can be controlled for example through the speed of a moving seed bed, such as a chain conveyor through the processing chamber.

Typically, the seed is evenly exposed to the treatment atmosphere. Preferably, the surface of the seed is evenly exposed such that generally all parts of the surface of a seed are exposed to the treatment atmosphere for substantially the same time. In a continuous process, the seed is preferably exposed to the treatment atmosphere while the seed is on or in a vibrating fluidised continuous bed. The transport rate is typically controlled by a built-in chain conveyor. The seed can furthermore be provided as a layer on a moving seed bed, wherein a treatment gas stream as treatment atmosphere can be blown from below through the moving seed bed into a processing chamber.

To increase energy efficiency, preferably the method is carried out in a system that is closed with respect to a gas stream, preferably by recirculating the treatment atmosphere in a closed loop. Also the gas stream used for cooling and/or drying can be recirculated for recovery of part of the heating energy, potentially combined with an air moisture trap to reduce the air humidity. Preferably, the heating energy can also be recovered by heat exchange between inlet and exhaust gas.

Preferably, the treatment atmosphere has a temperature of 50-100° C. and a relative humidity of 80% or more, and the exposure time is 1 second to 10 minutes, preferably 5-300 seconds.

For cereals, many vegetable seeds, rice and other crops, the treatment atmosphere preferably has a temperature of 50-95° C., more preferably 55-80° C., more preferably in combination with a relative humidity of 70-100%, more preferably 80-100%, even more preferably 90-100%; most preferably in combination with an exposure time of 30-600 seconds, more preferably 60-300 seconds. An exposure time of about 2 minutes (60-180 seconds), such as for cereals and vegetable seeds, is preferably used in combination with a 55-80° C. treatment atmosphere.

For alfalfa seed and other more heat tolerant species, the temperature is preferably in the range of 60-90° C., preferably in combination with the same preferred relative humidity and exposure times.

Without wishing to be bound by way of theory, the good results obtained with these treatments may at least in part be caused by softening of the hard seeds.

Preferably, the seed has a core temperature of 20-50° C. during at least part of the exposure time, preferably at the end of the exposure time. Preferably, the temperature in the core of the seeds is kept below 90° C. during the entire priming process, more preferably below 70° C. or below 50° C. This provides as advantage that germination is not harmed.

Preferably, the water content of the seed changes, preferably increases, during the exposure time by less than 10 wt. % based on the weight of the seed prior to exposure, more preferably by 1-5 wt. %. Optionally, the water content is not changed. This limited change of the water content advantageously provides better germination properties.

The method typically comprises a phase of cooling and optionally drying, wherein the seed is cooled and dried after the exposure to the treatment atmosphere.

This phase of cooling and optional drying typically comprises exposing the seed to a cooling and a drying atmosphere. The cooling atmosphere and the drying atmosphere can be the same or different. The drying and cooling can be carried out successively or partly or completely simultaneously with each other. Preferably, the phase comprises a first step of combined cooling and drying and thereafter a final cooling step. Typically, the step of combined cooling and drying comprises exposure of the seed to a drying atmosphere, typically with relative humidity of 50% or less, more preferably 20% or less, and a temperature below the treatment temperature but higher than ambient, typically 30-45° C. The drying atmosphere typically is air. The final cooling step typically comprises exposure of the seed to an atmosphere with a temperature of 30° C. or less, preferably not more than 5° C. above ambient temperature, or around ambient temperature, but more preferably lower, for example 10° C. lower than ambient temperature. The cooling step preferably comprises exposure of the seed to ambient air or air cooled to typically 10-25° C. Such a final cooling step can also be applied without a combined cooling/drying step. The seed is typically cooled to ambient temperature, or to less than 5° C. above ambient temperature, or to the storage temperature. The cooling phase is preferably carried out directly after the exposure of the seed to the treatment atmosphere. Preferably, the cooling is at least partly carried out with a cooling rate of 5° C./min or more, such as 10° C./min or more; for example in an initial cooling stage of cooling by 5-20° C. in 1 minute or less.

Preferably, the cooling phase comprises exposing the seed to an atmosphere having a temperature of 45° C. or less when the treatment atmosphere has a temperature of 50° C. or more. Optionally, the end of the exposure to the treatment atmosphere is determined by the start of an exposure of the seed to a different atmosphere having a temperature up to 45° C. and/or a relative humidity of 45% or less. In case of a batch-wise treatment, cooling optionally takes place in the same chamber as where the treatment takes place, or two or more different chambers. At least the last parts of the drying and cooling phase optionally take place in a silo, bin or an external dryer or cooler.

Typically, the method comprises a further step of withdrawing the cooled and optionally dried seeds from the processing chamber or from a cooling and/or drying chamber. The method optionally further comprises packaging the seed, typically in a packaging that is conventional for primed seed. The method may further comprise storing the treated seed. Storage conditions for primed seed are preferred for storing the treated seed. For example, the treated seed can be stored at 2-10° C., more preferably at about 5° C. This provides improved shelf life compared to storage at higher temperatures. Seeds can also be stored with the same storage conditions as for conventional non-primed seeds, for example in ambient. This provides lower storage costs. Preferably, the seed is stored and a germination test is carried out regularly on the stored seed, for example 6 months after the treatment and then after every three months. The seed can further be sown and germinated, thereby benefitting from the priming effect.

The seed may be any kind of crop. The seed can be of the order of *Monocotyledoneae* or from the order of *Dicotyledoneae*. Preferred examples from the order of *Monocotyledoneae* are rice seed and wheat, *Triticum aestivum*. More preferably the seed is a rice seed selected from the group consisting of *Oryza sativa japonica, Oryza glaberrima javanica, Oryza sativa indica, Zizania palustris*, and hybrids thereof.

Suitable seed further includes seed of soybean, cotton, corn, peanut, maize, wheat, barley, oat, rye, triticale, mustard, sunflower, sugar beet, safflower, millet, chicory, flax, rapeseed, buckwheat, tobacco, hemp seed, alfalfa, signal grass, clover, sorghum, chick pea, beans, peas, and vetch.

Suitable seed includes vegetable seed, herb seed, wildflower seed, ornamental seed and grass seed and tree and bush seeds. Examples of vegetable seeds include asparagus, chives, celery, leek, garlic, beetroot, spinach, beet, curly kale, cauliflower, sprouting broccoli, savoy cabbage, white cabbage, red cabbage, kohlrabi, Chinese cabbage, turnip, endive, chicory, water melon, melon, cucumber, gherkin, marrow, parsley, fennel, pea, beans, radish, black salsify, eggplant, sweet corn, pop corn, carrot, onion, tomato, pepper, lettuce, snap bean, cucurbit, shallot, broccoli, and Brussels sprout.

The seed are optionally pelleted or coated, for example in case of sugar beet and root chicory. Such a coating may for instance protect the seeds from damage or may reduce the dust or may improve the plantability by increasing the flow characteristics. Advantageously, the coating can comprise one or more active ingredients, for example fungicidal agents, bactericidal agents, insecticidal agents, nematicidal agents, molluscidal agents, biocides, disinfectants, microorganisms, rodent killers, weed killers (herbicides), attracting agents, repellent agents, plant growth regulators, nutrients (such as potassium nitrate, magnesium sulphate, iron chelate), plant hormones, minerals, plant extracts, acaricides or miticides, molluscicides, germination stimulants, pheromones, biological preparations, chitosan, chitine-based preparations, etc. The coating can involve film coating or pelleting. Optionally, the seed comprises a coating composition as described in WO-A-2011/028115, the content of which is herewith completely incorporated by reference.

The method for preparing primed seed according to the invention can be combined with conventional priming methods, for example osmotic priming, hydropriming, solid matrix priming and drum priming. These can for example be carried out prior to the method of the invention. Preferably, however these conventional priming methods can be carried out after the method of the invention.

The method preferably comprises a step of carrying out a pre-test and a step of optimising the parameters of the exposure of the seed to the treatment atmosphere.

The pre-test step preferably comprises taking a representative sample from a seed lot and measuring one or more properties of the seed of the representative sample or representative sub-samples thereof. Suitable properties include the size, volume, moisture content and mass of the seed. As part of the pre-test, the germination time course of untreated seed can be measured. The pre-test step can also comprise determining a probable germination time course in case the seed lot would be sown as non-primed seed, based on known germination time courses of non-primed seed with similar properties as determined for the sample. The pre-test step can further comprise determining a probable germination time course in case the seed would be exposed to the treatment atmosphere under certain conditions, based on known germination time courses of seed with similar properties as determined for the sample and exposed to the treatment atmosphere under those conditions.

The optimisation step can comprise determining a difference between a predicted germination time course obtained in the pre-test step and a desired germination time course and adjusting one or more parameters of the exposure of the seed to the treatment atmosphere based on this difference. The optimisation step preferably comprises adjusting one or more parameters of said exposing the seed to the treatment atmosphere based on one or more pre-established relations between such parameters and a desired change in the germination time course. Suitable parameters include the temperature, relative humidity and flow rate of the treatment atmosphere and the exposure time, as well as drying and cooling parameters.

Generally, the parameters are optimised to obtain a desired germination time course of said seed, in particular to obtain a desired germination rate and/or germination synchronicity.

The process preferably comprises providing a desired germination time course, determining the actual germination time course of one or more primed or non-primed samples of said seed lot, determining the differences between said desired and said actual germination time course and changing one or more parameters of the exposure of the seed to the treatment atmosphere.

For example, the pre-test step can comprise measuring the average size of the seeds of the sample and the optimisation step can comprise, in case of a sample of seeds with a relatively large size, increasing the duration of the exposure, based on a pre-established relation indicating that larger seeds require longer exposure in order to be sufficiently primed. Preferably, the method comprises a pre-test wherein representative samples are subjected to the method steps of the invention, and one or more parameters selected from temperature, humidity and flow rate of the treatment atmosphere and exposure time are varied between representative sub-samples of a seed lot. The performance of the seeds, including germination and/or vigour of the treated sub-samples is tested. The method then comprises determining optimal process parameters for the treatment of the bulk of the seed lot.

Hence, a preferred method comprises:
taking a representative sample from a seed lot,
dividing said sample in representative sub-samples,
exposing said sub-samples to at least one treatment atmosphere, wherein one or more parameters selected from the exposure time and temperature, relative humidity and flow rate of the treatment atmosphere are varied over the sub-samples,
determining germination time and seed vigour of treated sub-samples and optionally a non-treated control sub-sample,
determining optimum values for said parameters based on said determined germination time and seed vigour,
and thereafter priming a bulk of said seed lot by:
providing said bulk of said seed lot,
exposing said bulk of said seed lot to a treatment atmosphere under said determined optimised parameters, preferably within the ranges of temperature, humidity and exposure time, and other process parameters as described herein,
cooling and optionally drying said bulk of said seed lot, preferably as described herein.

The invention also relates to a method for improving the germination rate of seed that comprises priming seed according to the method for preparing primed seed described herein. Improving the germination rate of the seed typically comprises increasing the germination rate of the seed. Preferably, improving the germination rate of the seed comprises improving the germination synchronicity of the seed, in particular increasing the germination synchronicity of the seed. Preferably, the improvement in the germination rate is independent of the pathogen load of the seed, such as observed with pathogen-free seed.

In yet a further aspect, the invention relates to the use of a gaseous composition comprising air and water vapour in an amount of 50% or more relative humidity for priming seed at 50-100° C., preferably as treatment atmosphere in a method of the invention. Hence, the gaseous composition has a temperature of 50-100° C. Preferably, the composition comprises water vapour at 60% relative humidity or more, more preferably 70% or more, even more preferably 80% or more, or 90% or more. Preferably, the gaseous composition comprises water vapour at a relative humidity of 100% or less, for example 95% or less. The use can also be use of such gaseous composition as seed priming composition and/or use to obtain the effect of seed priming.

Preferably, the gaseous composition is used in a method for priming seed involving the described preferred exposure time, temperature and other preferred process parameters as described.

The invention will now be further illustrated by the following non-limiting examples.

EXAMPLES

FIGS. 1-7 show experimental results of the change of the plant emergence by the priming method of the invention, measured as the number of plants emerged from pots with potting soil under cold stress (seedling vigour). The change in number is shown per 100 sown seeds. Positive values indicate an increase in the number of plants, as a result of the priming method of the invention. The results for a number of samples are shown; the samples are sorted on the horizontal axis on increasing number of plants. The used seeds were regular cereal production seed samples, with in FIGS. 1, 3, 5 and 7 regular levels of the common seed-borne pathogens, in particular *Fusarium* spp., *Septoria* spp. and *Microdochium* spp. (wheat) and *Fusarium* spp. and *Helminthosporium* species (like *Drechslera* spp. and *Bipolaris*) (oats and barley).

Figure 2:
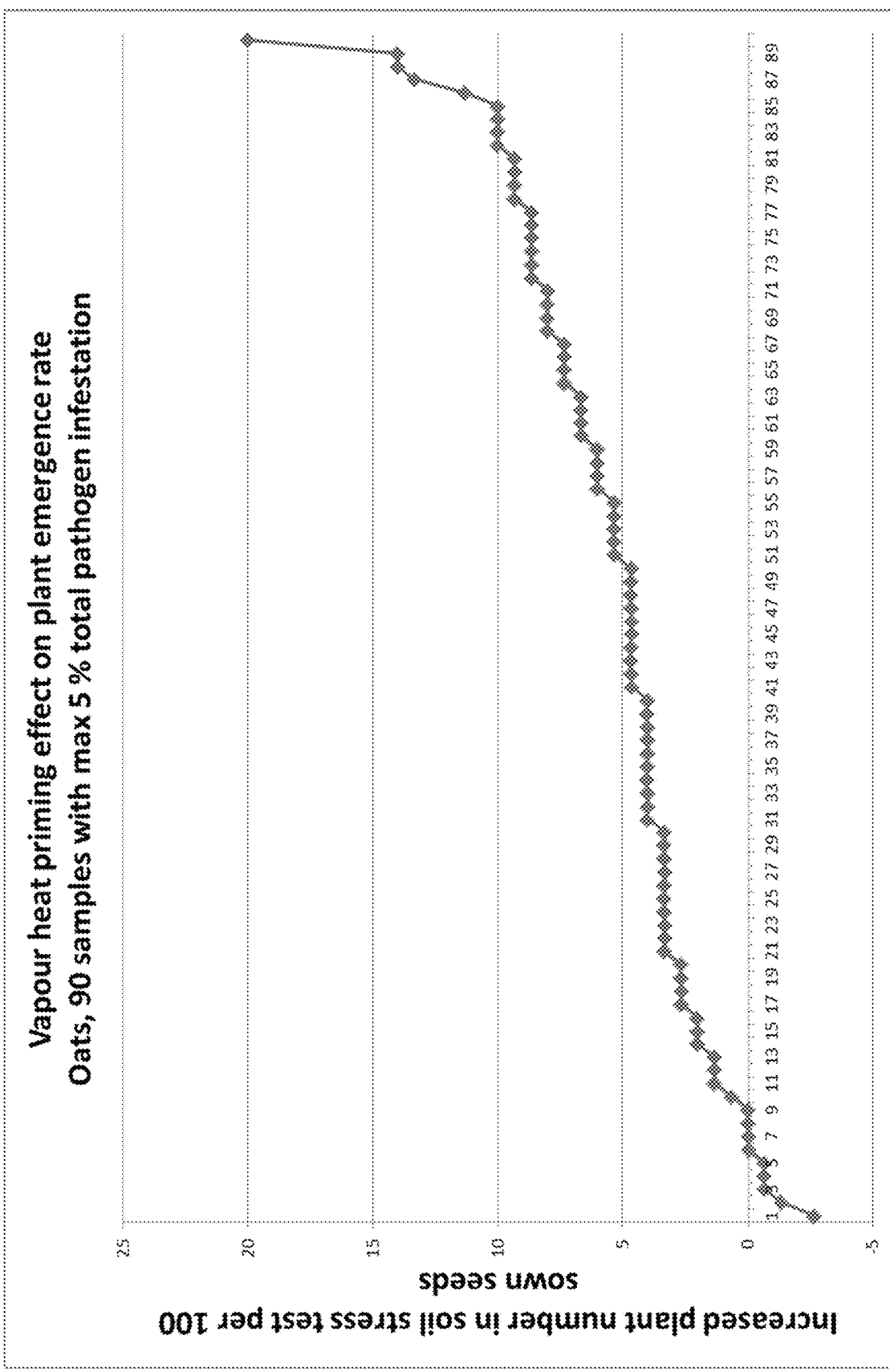
FIG. 2 is a graph showing the increase in plant emergence of Oats per 100 sown seeds for 90 samples of seeds with a maximum of 5% total pathogen infestation primed in accordance with the present invention, the samples sorted on the horizontal axis by increasing number of plants.
Figure 3:
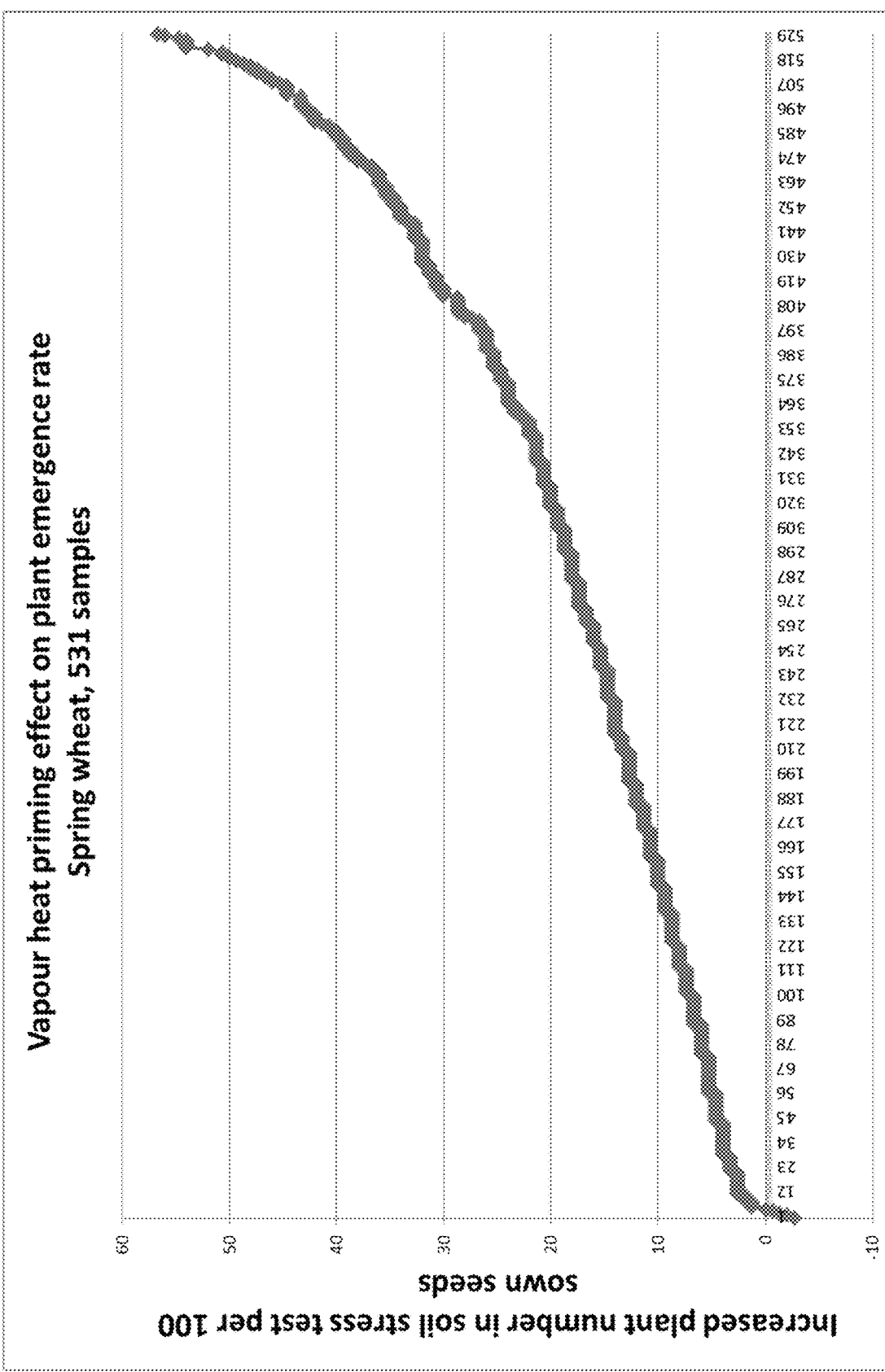
FIG. 3 is a graph showing the increase in plant emergence for Spring wheat per 100 sown seeds for 531 samples of seeds primed in accordance with the present invention, the samples sorted on the horizontal axis by increasing number of plants.
Figure 4:
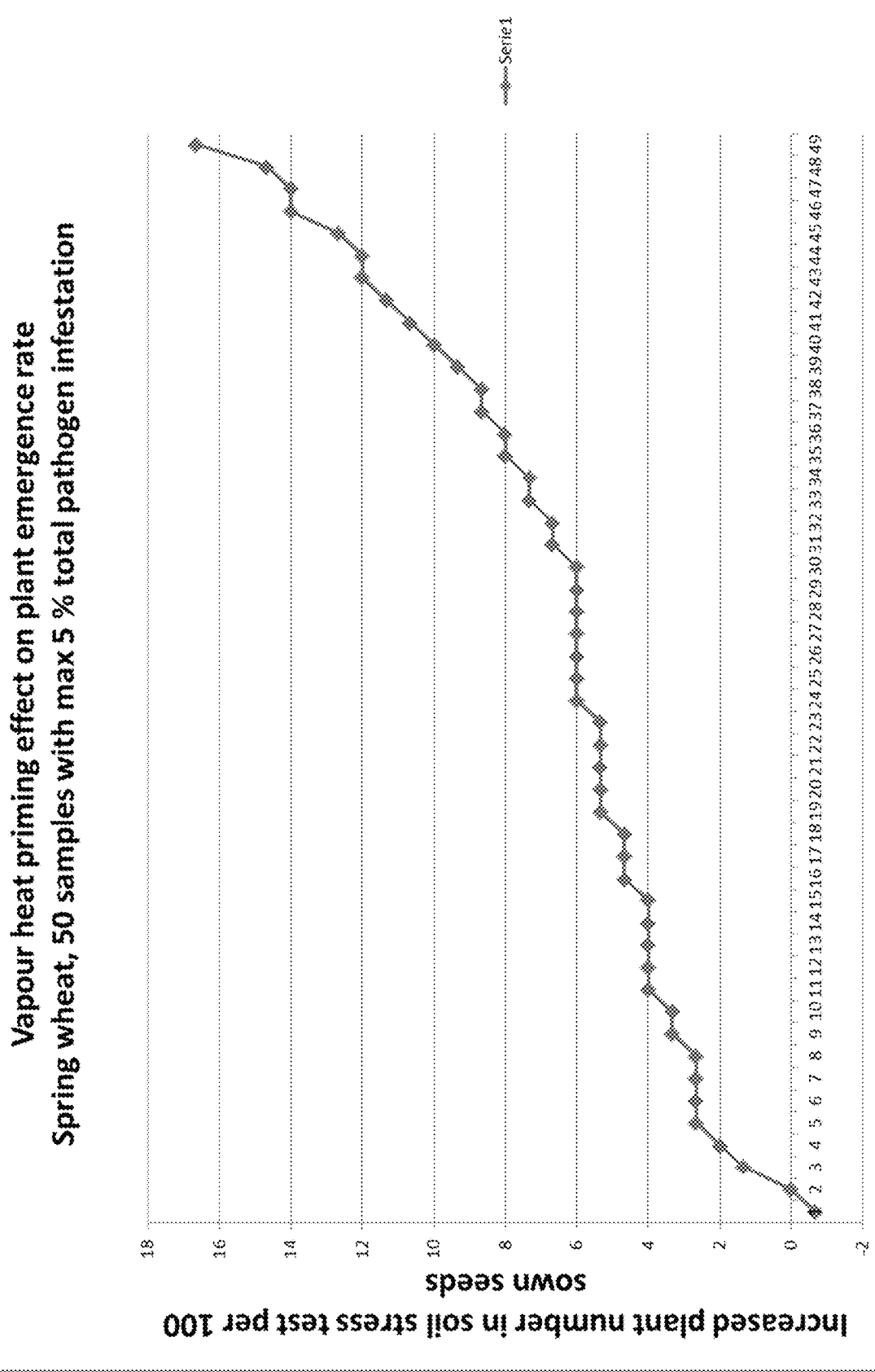
FIG. 4 is a graph showing the increase in plant emergence of Spring wheat per 100 sown seeds for 50 samples of seeds with a maximum of 5% total pathogen infestation primed in accordance with the present invention, the samples sorted on the horizontal axis by increasing number of plants.
Figure 5:
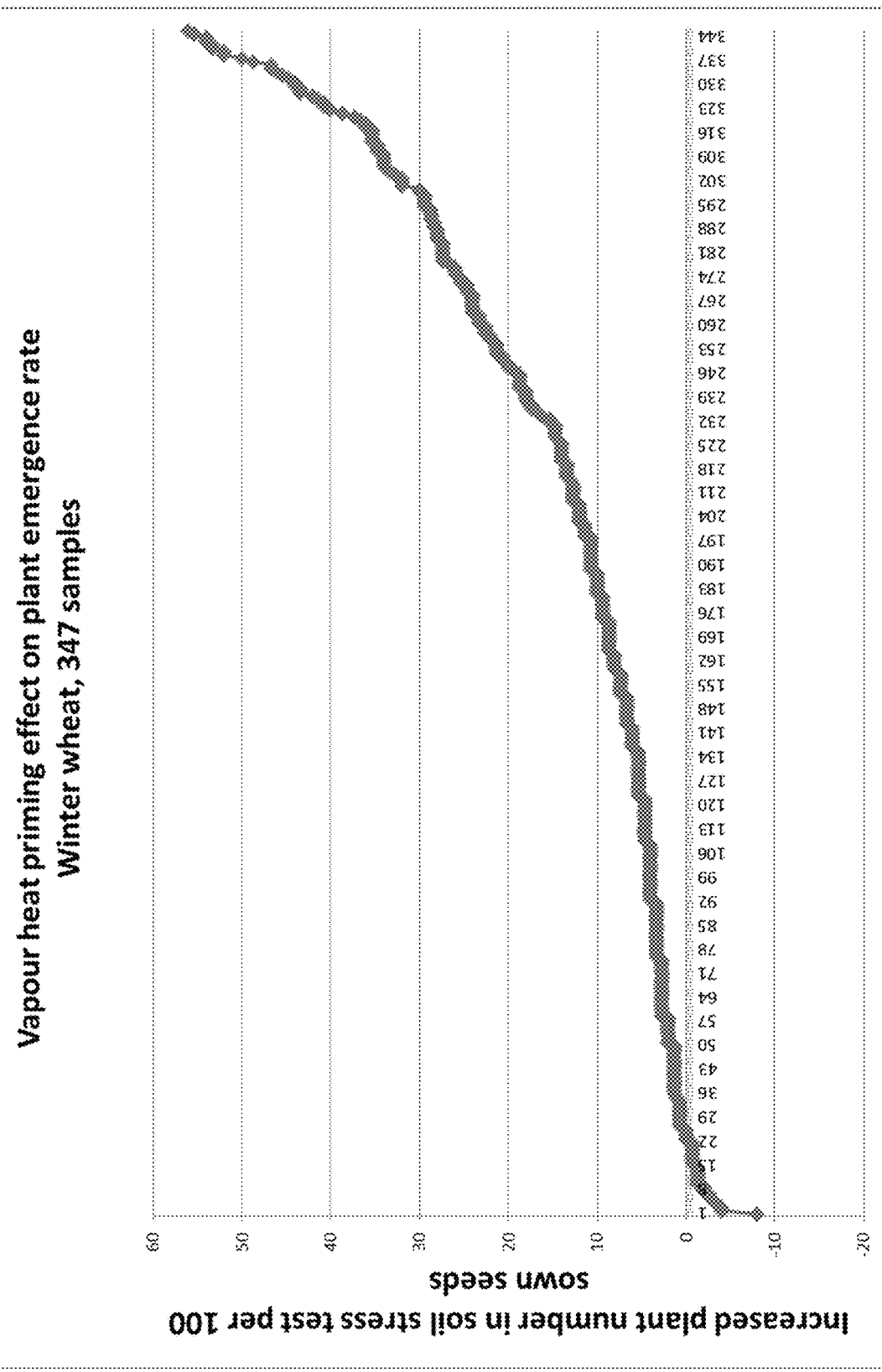
FIG. 5 is a graph showing the increase in plant emergence for Winter wheat per 100 sown seeds for 347 samples of seeds primed in accordance with the present invention, the samples sorted on the horizontal axis by increasing number of plants.
Figure 6:
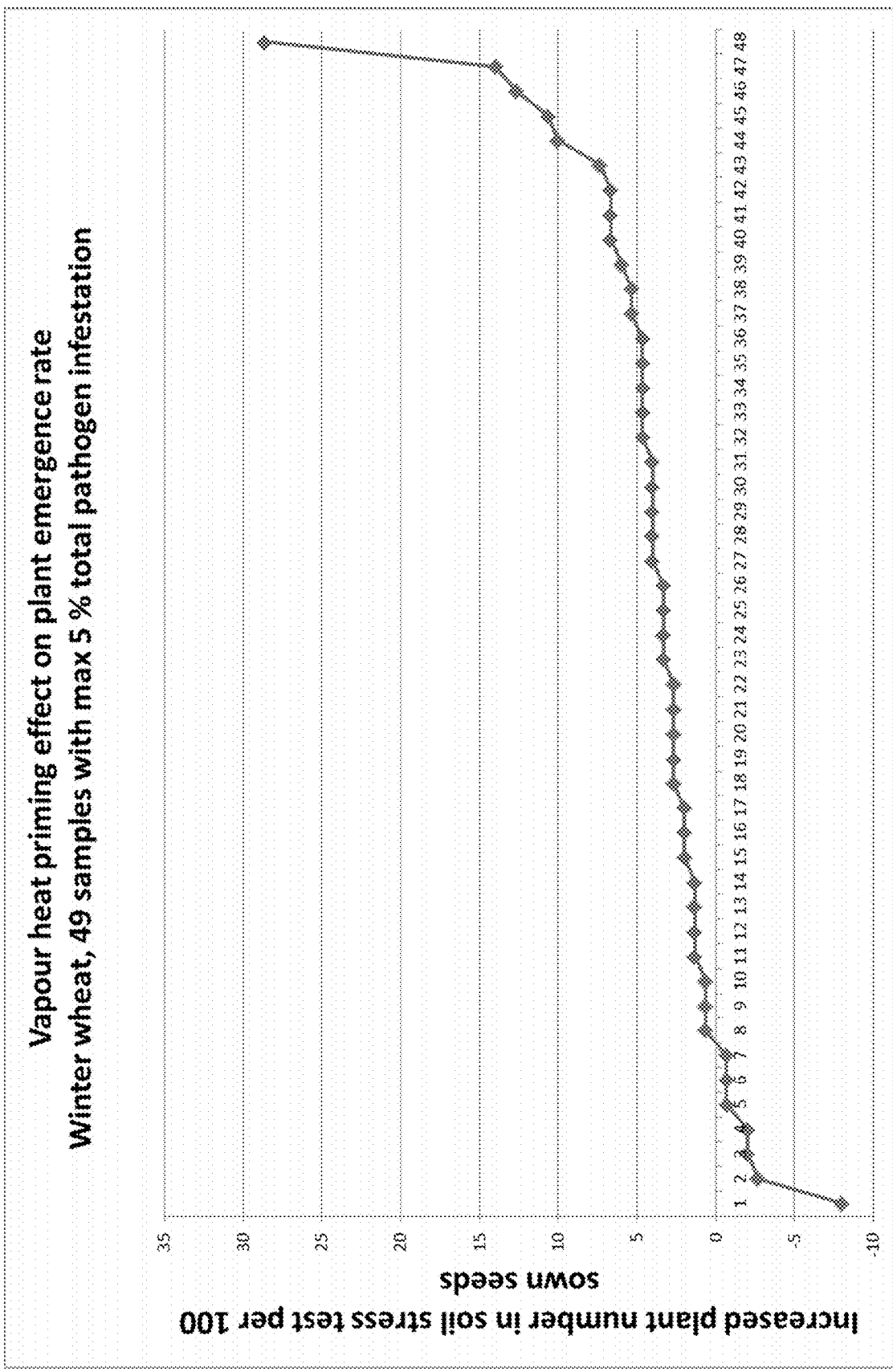
FIG. 6 is a graph showing the increase in plant emergence of Winter wheat per 100 sown seeds for 49 samples of seeds with a maximum of 5% total pathogen infestation primed in accordance with the present invention, the samples sorted on the horizontal axis by increasing number of plants.
Figure 7:
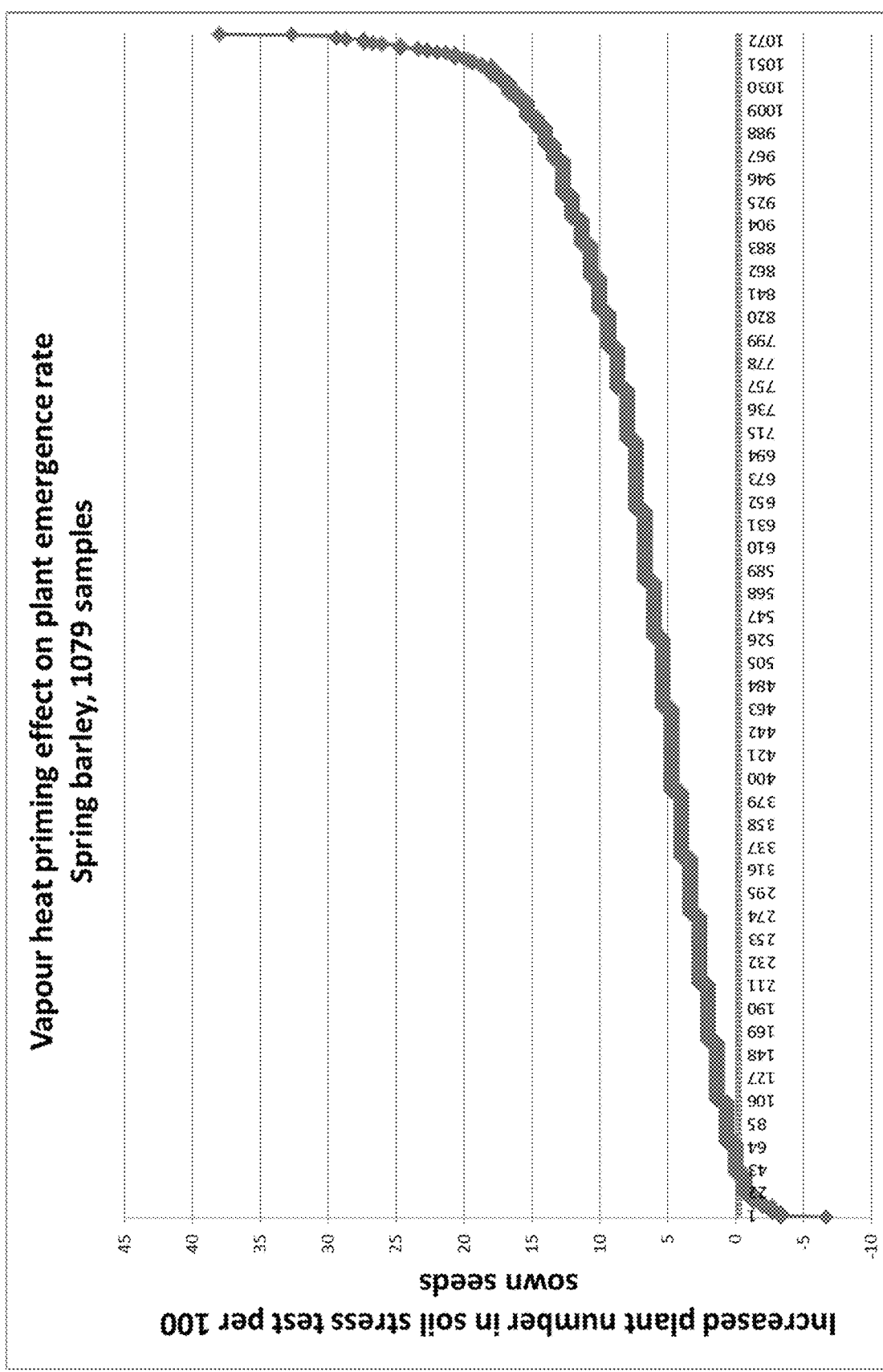
FIG. 7 is a graph showing the increase in plant emergence for Spring barley per 100 sown seeds for 1079 samples of seeds primed in accordance with the present invention, the samples sorted on the horizontal axis by increasing number of plants.

FIG. 1 shows an increase in the plant number for Oats as an effect of the method of the invention (referred to in the figure as Vapour heat priming effect). For a majority of the samples, an increase of more than 10% in the plant number was obtained. FIG. 2 shows the results for Oats for samples with max. 5% total pathogen infestation. Total pathogen infestation refers to the total sum of disease levels of all known infesting pathogenic fungi on the seeds in the sample. This confirms that there is a strong priming effect, which is not the result of any potential disinfection or pathogen suppression. For more than half of the samples, an increase of about 5% or more was obtained. FIG. 3 shows the results for spring wheat. For half of the samples, an increase in plant number of about 15% or more was obtained. FIG. 4 shows the results for spring wheat samples with max 5% total pathogen infestation. For more than half of the samples, an increase of 6% or more was obtained. This shows that the method has a positive effect on the plant emergence that surpasses any potential effect caused by disinfection. FIG. 5 shows experimental results for winter wheat. An increase of about 10% or more was obtained for more than half of the samples. FIG. 6 shows experimental results for winter wheat samples with max. 5% total pathogen infestation. Also for this crop, a priming effect separate from any disinfection effect was confirmed by these results. Finally, FIG. 7 shows the priming effect for spring barley. The results of FIGS. 1-7 demonstrate that the priming effect is not caused by potential disinfestation of the seed. The priming effect of the method of the invention gives much stronger influence on plant development than what would have been the result of any pure disinfestation alone, indicating a strong physiological effect.

Figure 8:
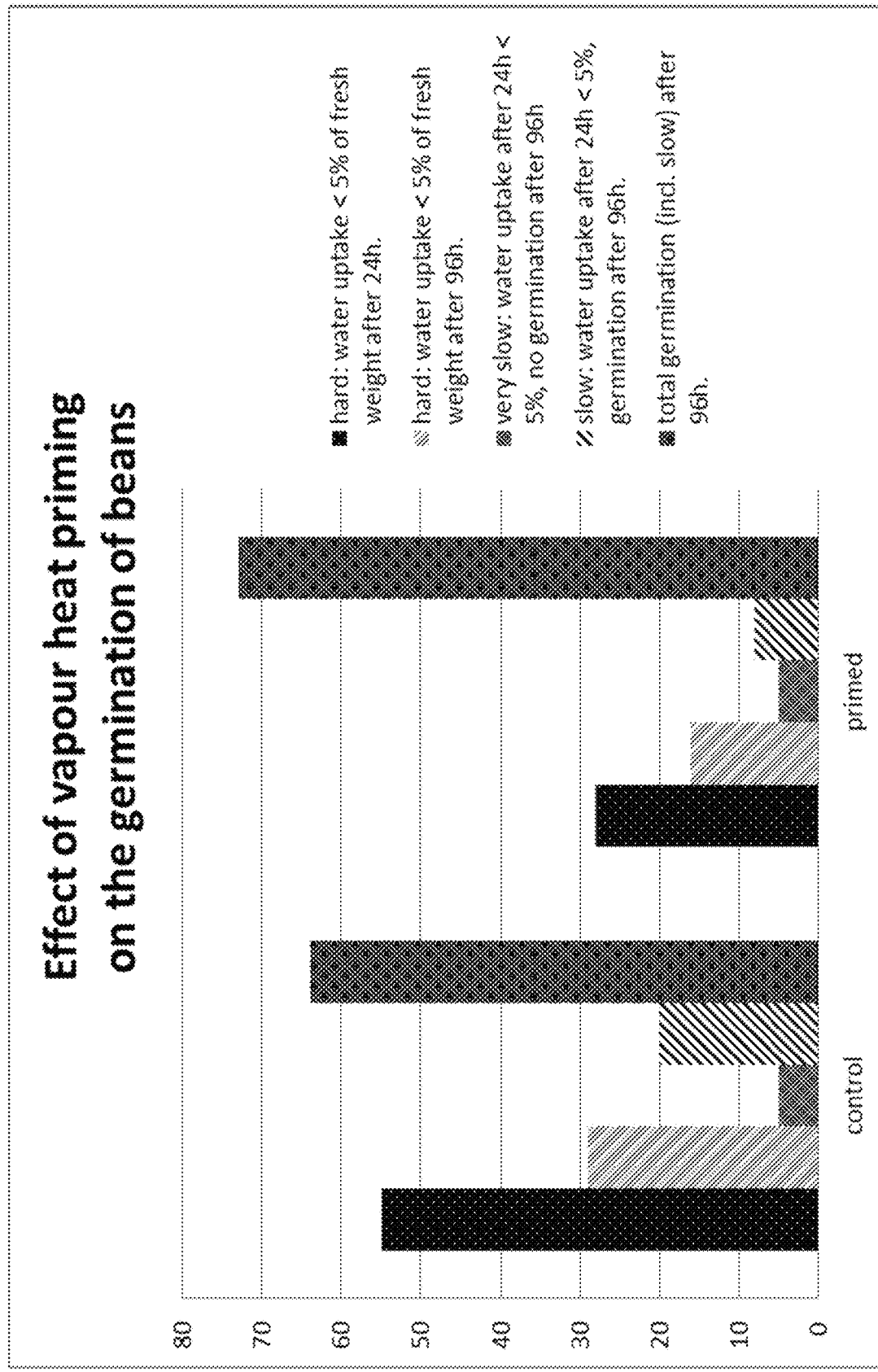
FIG. 8 is a bar graph showing the effect of priming beans (Phaseolus vulgaris L.) in accordance with the present invention as compared to a control group of beans.

FIG. 8 shows experimental results of priming of beans (*Phaseolus vulgaris* L.) with the method of the invention. With priming, water uptake was improved, resulting in a decrease in the number of slow germinating and hard seeds and an increase in the number of germinated seeds four days after planting.

Table 1 shows emergence rate (6 and 7 days) and final plant emergence (10 days) results for 10 different cultivars of rice. The rice seed was soaked for 3 days at 15° C. before the actual germination test, which involved soaking for 1 day at 32° C., followed by sowing in 140 g base soil and 60 g cover soil, followed by 2 days at 32° C., followed by growing at 20° C., until 10 days. Given are emergence values. An improved emergence rate is observed at day 6 and 7 for rice seed primed with the method of the invention. The final emergence is on average the same for control and primed seed, indicating that the emergence rate increase at day 6 and 7 is due to a priming effect.

TABLE 1

| Cultivar | | Day | | |
|---|---|---|---|---|
| | | 6 | 7 | Final (10) |
| Cultivar sample 1 | control | 34 | 57 | 96 |
| | primed | 77 | 85 | 99 |
| Cultivar sample 2 | control | 29 | 55 | 98 |
| | primed | 57 | 77 | 97 |
| Cultivar sample 3 | control | 62 | 77 | 97 |
| | primed | 82 | 88 | 95 |
| Cultivar sample 4 | control | 49 | 87 | 97 |
| | primed | 70 | 89 | 96 |
| Cultivar sample 5 | control | 56 | 69 | 97 |
| | primed | 69 | 77 | 96 |
| Cultivar sample 6 | control | 53 | 66 | 98 |
| | primed | 66 | 76 | 99 |
| Cultivar sample 7 | control | 27 | 59 | 99 |
| | primed | 51 | 83 | 99 |
| Cultivar sample 8 | control | 56 | 83 | 98 |
| | primed | 65 | 86 | 95 |
| Cultivar sample 9 | control | 40 | 68 | 97 |
| | primed | 49 | 71 | 99 |
| Cultivar sample 10 | control | 63 | 87 | 98 |
| | primed | 80 | 89 | 97 |
| Averages | control | 47 | 71 | 97 |
| | primed | 67 | 82 | 97 |

The invention claimed is:

1. Method for priming seed, comprising successively:
(a) providing seed that is capable of germinating,
(b) exposing said seed to a treatment atmosphere for an exposure time of 90 to 180 seconds, wherein the treatment atmosphere has a relative humidity of 80% or more and a temperature of 55-80° C.,
(c) during said exposure time, increasing the water content of the seed by 1 wt. % to less than 10 wt. % based on the weight of the seed prior to exposure, and
(d) cooling and drying said seed.

2. Method according to claim 1, wherein the temperature of the treatment atmosphere is kept substantially constant within a range of +/−2° C. for said exposure time.

3. Method according to claim 1, wherein the dew point is kept substantially constant within a range of +/−2° C. for said exposure time.

4. Method according to claim 1, wherein said cooling comprises exposing said seed to an atmosphere having a temperature of 45° C. or less.

5. Method according to claim 1, wherein the method comprises combined drying and cooling said seed by exposing said seed to an atmosphere having a relative humidity of 50% or less, and a temperature below the temperature of the treatment atmosphere but higher than ambient.

6. Method according to claim 5, wherein drying and cooling said seed comprising exposing said seed to an atmosphere having a relative humidity of 20% or less.

7. Method according to claim 1, wherein seed is provided in step (a) as essentially pathogen-free seed.

8. Method according to claim 1, wherein the seed comprises cereal kernels or vegetable seeds.

9. Method according to claim 8, wherein the seed comprises rice seed.

10. Method according to claim 1, comprising:
taking a representative sample from a seed lot,
dividing said sample in representative sub-samples,
exposing said sub-samples to at least one treatment atmosphere, wherein one or more parameters selected from the exposure time and temperature, relative humidity and flow rate of the treatment atmosphere are varied over the sub-samples,
determining germination time and seed vigour of treated sub-samples,
determining optimum values for said parameters based on said determined germination time and seed vigour,
and thereafter priming a bulk of said seed lot by:
providing said bulk of said seed lot,
exposing said bulk of said seed lot to a treatment atmosphere under said determined optimised parameters,
cooling said bulk of said seed lot.

11. Method according to claim 10, further comprising measuring one or more properties of seed of said lot selected from the size, volume, mass of the seed and moisture content and wherein determining optimised values for said parameters is further based on the measured one or more properties.

12. Method of claim 10 further comprising drying said bulk of said seed subsequent to said exposing said bulk of said seed lot to a treatment atmosphere.

* * * * *